United States Patent [19]

Hayakawa et al.

[11] Patent Number: 5,195,802
[45] Date of Patent: Mar. 23, 1993

[54] SEAT CUSHION LATCHING DEVICE FOR AUTOMOTIVE SEAT

[75] Inventors: Hatsuo Hayakawa; Mikio Honma; Hidemasa Hirakui, all of Yokohama; Hideki Irie; Mikio Fujiwara, both of Kanagawa, all of Japan

[73] Assignees: Ikeda Bussan Co., Ltd., Ayase; Ohi Seisakusho Co., Ltd., Yokohama, both of Japan

[21] Appl. No.: 623,497

[22] Filed: Dec. 7, 1990

[30] Foreign Application Priority Data

Feb. 9, 1990 [JP] Japan .................................. 2-28258

[51] Int. Cl.5 .............................................. B60N 2/30
[52] U.S. Cl. ................................. 297/335; 297/336; 297/334
[58] Field of Search ............... 297/331, 335, 336, 344; 296/65.1

[56] References Cited

U.S. PATENT DOCUMENTS 3,059,964 10/1962 Hoppe et al. .................... 296/65.1

FOREIGN PATENT DOCUMENTS 818829 4/1986 Japan .................................. 297/335

Primary Examiner—James R. Brittain
Assistant Examiner—Cassandra L. Hope
Attorney, Agent, or Firm—Foley & Lardner

[57] ABSTRACT

An automotive seat having a seat cushion latching device is disclosed, in which the changing of the seat cushion from an operative latched position to a folded latched position or vice verse is achieved by manipulating only one operation lever. The automotive seat comprises a seat cushion; a pivot mechanism for permitting the seat cushion to pivot between an operative position and a folded position with respect a fixed member; first and second strikers secured to spaced portions of the seat cushion; a base structure secured to the fixed member; a first latching mechanism installed in the base structure for latching the first striker when the seat cushion assumes the operative position; a second latching mechanism installed in the base structure for latching the second striker when the seat cushion assumes the folded position; an operation lever pivotally supported by the base structure; and a link mechanism linking the operation lever to both the first and second latching mechanisms so that a pivotal movement of the operation lever in a given direction cancels a latched condition of either one of the first and second latching mechanisms.

17 Claims, 9 Drawing Sheets

SEAT CUSHION LATCHING DEVICE FOR AUTOMOTIVE SEAT

BACKGROUND OF THE INVENTION

1. Field of the Invention

The present invention relates in general to seat cushion latching devices for automotive seats, and more particularly, to the seat cushion latching devices of a type which can latch the seat cushion of the seat at a folded position as well as at an operative (viz., seat occupant holding) position.

2. Description of the Prior Art

Hitherto, in the seat cushion latching devices, various types have been proposed and put into practical use. However, due to their inherent constructions, some of them have failed to provide an easiness with which the device is manipulated by a user. In fact, among the latching devices, widely used is a type in which two latching devices having respective operation levers are employed for latching the seat cushion at the operative and holded positions respectively. In this type, both the two operation levers must be manipulated or handled by the user each time there is a need of changing of the seat cushion from the operative latched position to the folded latched position and vice versa.

SUMMARY OF THE INVENTION

It is therefore an object of the present invention to provide a seat cushion latching device for an automotive seat, which device is constructed to be easily manipulated.

According to the present invention, there is provided a seat cushion latching deive for an automotive seat, in which the changing of the seat cushion from an operative latched position to a folded latched position or vice verse is achieved by manipulating only one operation lever.

According to the present invention, there is provided an automotive seat. The automotive seat comprises a seat cushion; pivot means for permitting the seat cushion to pivot between an operative position and a folded position with respect a fixed member; first and second strikers secured to spaced portions of the seat cushion; a base structure secured to the fixed member; first latching means installed in the base structure for latching the first striker when the seat cushion assumes the operative position; second latching means installed in the base structure for latching the second striker when the seat cushion assumes the folded position; an operation lever pivotally supported by the base structure; and link means linking the operation lever to both the first and second latching means so that a pivotal movement of the operation lever in a given direction cancels a latched condition of either one of the first and second latching means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
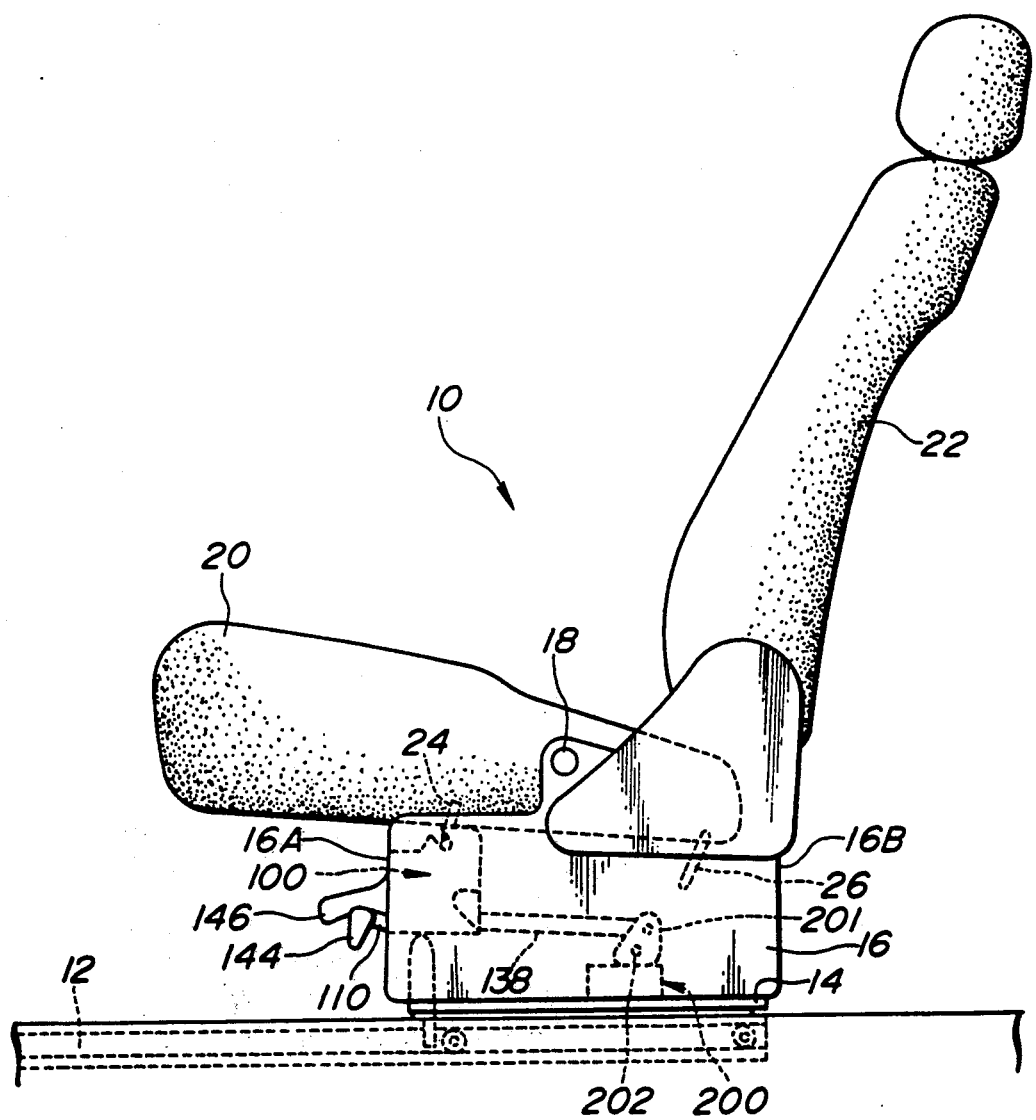
FIG. 1 is a side view of an automotive seat to which a seat cushion latching device of the present invention is applied, showing a condition wherein the seat cushion assumes an operative latched (viz., seat occupant holding) position.
Figure 2:
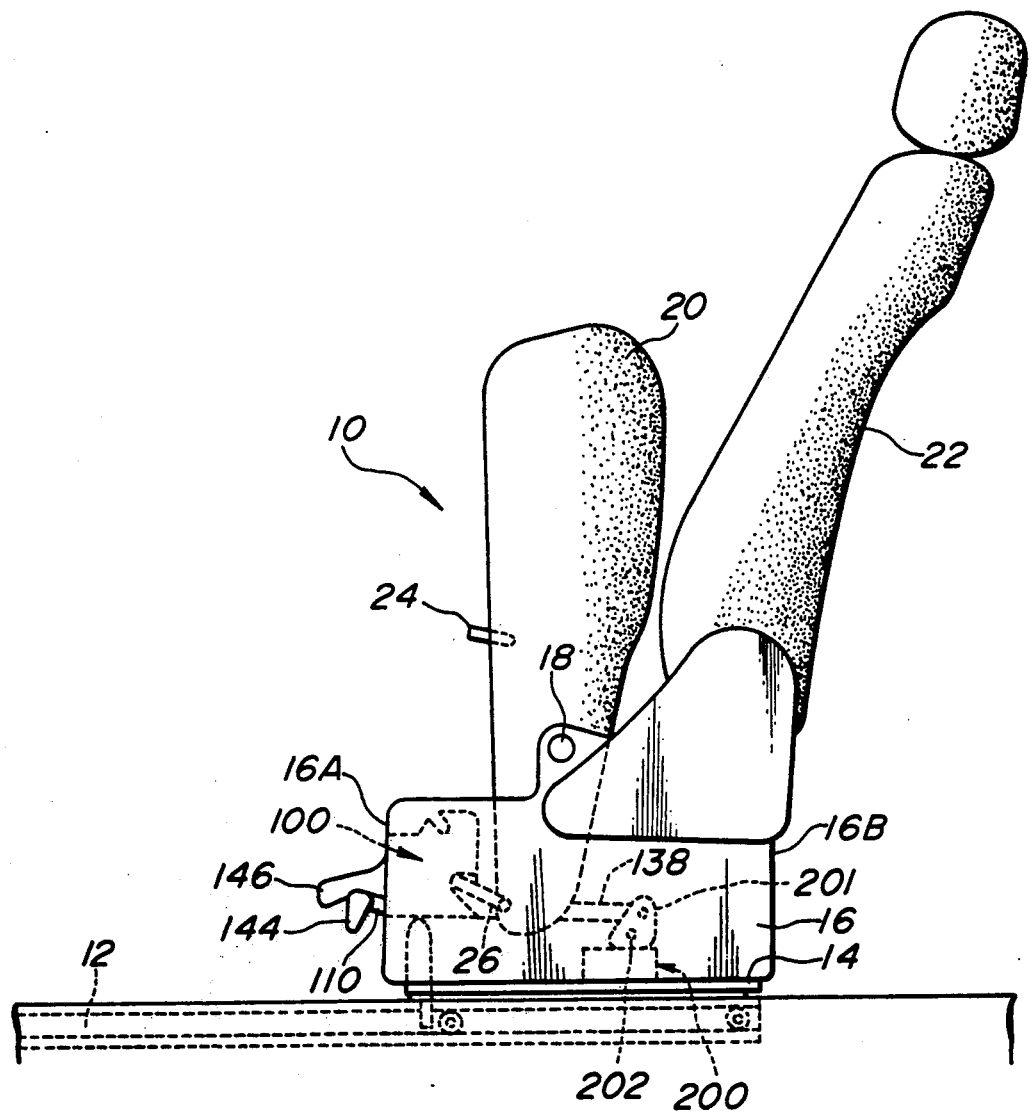
FIG. 2 is a view similar to FIG. 1, but showing a condition wherein the seat cushion assumes a folded latched position.

Referring to FIGS. 1 and 2 of the accompanying drawings, there is shown an automotive seat 10 to which a seat cushion latching device of the present invention is practically applied.

The seat 10 comprises a pair of sliding members 14 which slide on and along respective fixed rails 12 mounted on a vehicle floor (no numeral), a pair of support members 16 which are secured to and raised from the sliding members 14, front and rear walls 16A and 16B which are secured to front ends and rear ends of the supporting members 16, a seat cushion 20 which is pivotally held by the support members 16 by means of a pivot shaft 18, so that the seat cushion 20 can take an operative (viz., seat occupant holding) position as shown in FIG. 1 and a folded position as shown in FIG. 2, and a seatback 22 which is mounted to the support members 16 through a known reclining mechanism, so that an inclination angle of the seatback 22 relative to the supporting members 16 is adjustable.

As is seen from FIG. 1, the seat cushion 20 has at its lower surface portion a first striker 24 secured thereto and at its rear lower surface portion a second striker 26 secured thereto. Each striker 24 or 26 is generally U-shaped. Preferably, reinforcing members are used for securing the strikers 24 and 26 to the seat cushion 20.

Within a space defined by the supporting members 16 and the front and rear walls 16A and 16B, there are mounted a seat cushion latching mechanism 100 and a seat slide latching mechanism 200, which will be described in the following.

Figure 3:
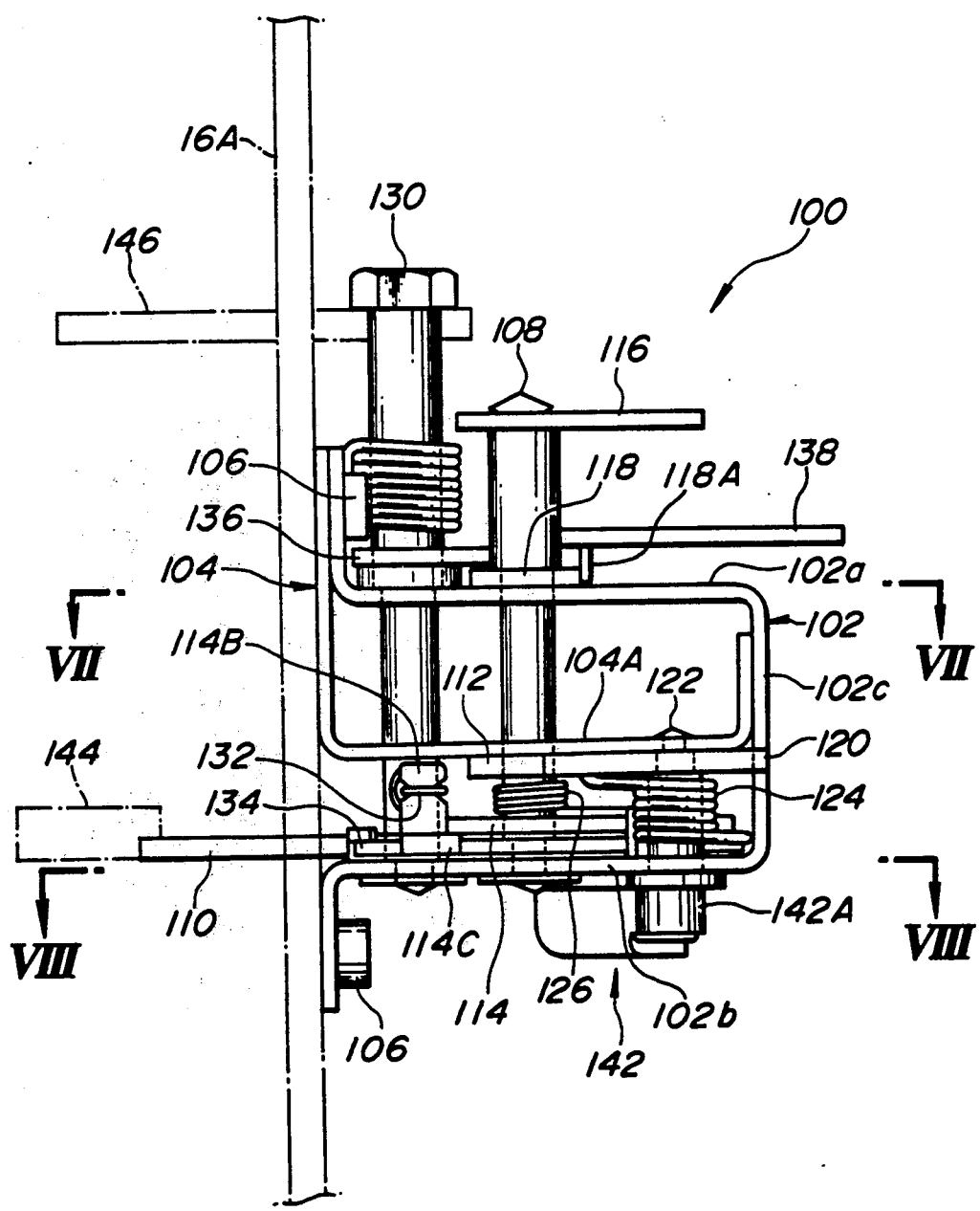
FIG. 3 is a plan view of the seat cushion latching device of the invention.

As is seen from FIGS. 3 to 7, particularly FIG. 3, the seat cushion latching mechanism 100 comprises a base structure which is secured to the front wall 16A of the supporting members 16. The base structure includes a first base plate 102 and a second base plate 104. The first base plate 102 has opposed side walls 102a and 102b connected through a base wall 102c. The second base plate 104 is generally L-shaped and secured to the first base plate 102 in a manner to form an intermediate wall 104A between the opposed side walls 102a and 102b. The base structure (102+104) has a plurality of welded nuts 106 with which bolts (not shown) are engaged to secure the base structure (102+104) to the front wall 16A, as is understood from FIG. 3.

Designated by numeral 108 is a first pivot shaft which is rotatably supported by the base structure (102+104). More specifically, the first pivot shaft 108 passes through aligned openings which are formed in the opposed side walls 102a and 102b of the first base plate 102 and the intermediate wall 104A of the second base plate 104.

An operation lever 110 is secured to the first pivot shaft 108 to pivot therewith. The operation lever 110 has a front portion which is exposed to the front of the front wall 16A. A first control handle 144 is secured to the front end of the operation lever 110.

As will be described in detail hereinafter, a latching plate 112 and a latch condition detecting lever 114 are pivotally connected to the first pivot shaft 108, and a cam plate 116 and a pawl member 118 are secured to the first pivot shaft 108 to pivot therewith.

Designated by numeral 120 is a first latch member which can be latched by the above-mentioned latching plate 112. The first latch member 120 is pivotally disposed about a shaft 122 which is spanned between and secured to the side wall 102b and the intermediate wall 104A of the base structure (102+104). A coil spring 124 is disposed about the shaft 122 to bias the first latch member 120 in a clockwise direction in FIG. 5.

Figure 5:
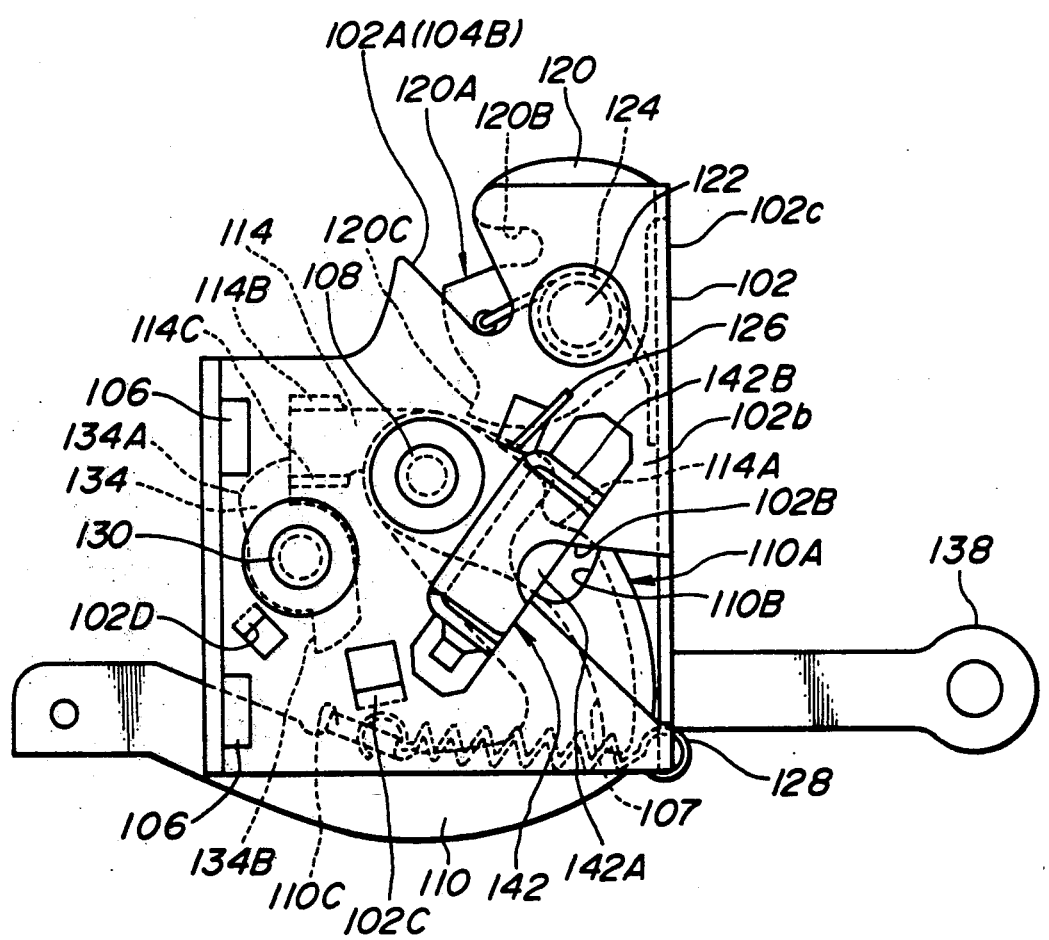
FIG. 5 is a left side view of the seat cushion latching device of the invention with a latching plate removed.

As is understood from FIG. 5, the side wall 102b and the intermediate wall 104A of the base structure (102+104) have at their upper portions respective recesses 102A and 104B which are aligned to receive the above-mentioned first striker 24.

The first latch member 120 is formed with a striker catching recess 120B by which the first striker 24 can be caught. The catching recess 120B has a lower peripheral side 120A against which the first striker 24 is collidable. Furthermore, the first latch member 120 is formed with a stepped portion 120C with which an end of the latching plate 112 is latchingly engageable.

Figure 8:
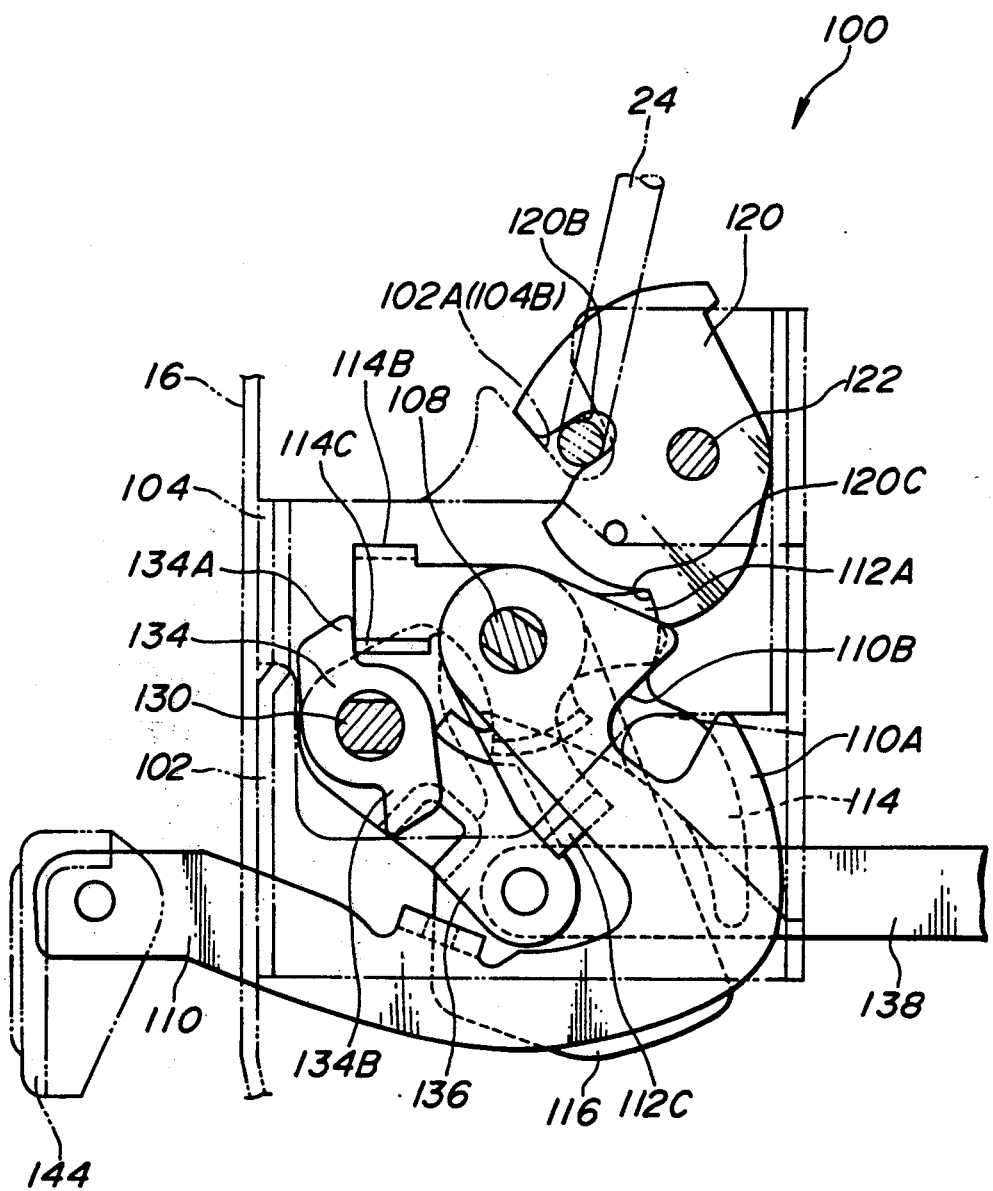
FIG. 8 is a sectional view taken along the line VIII—VIII of FIG. 3, showing one condition of the device.
Figure 9:
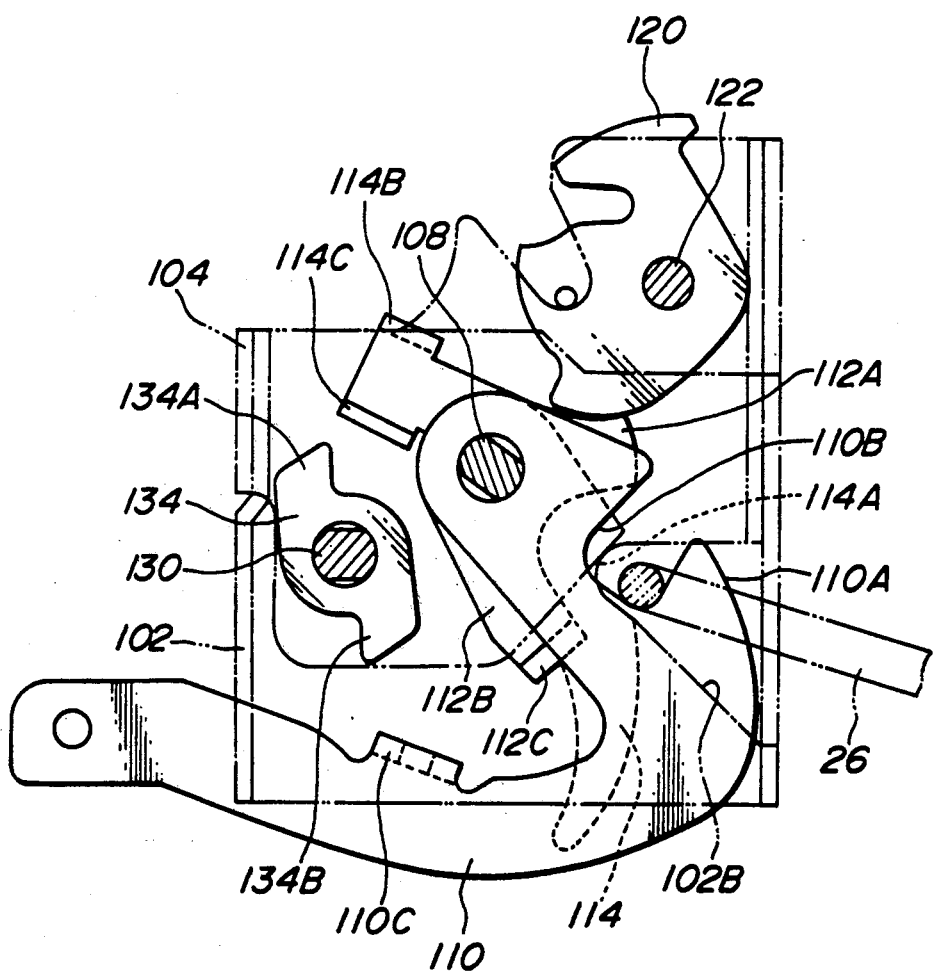
FIG. 9 is a view similar to FIG. 8, but showing the other condition of the device.

As is seen from FIGS. 8 and 9, the latching plate 112 is generally L-shaped and has a first leg portion 112A whose leading end is latchingly engageable with the stepped portion 120C of the first latch member 120, and a second leg portion 112B whose leading end has a bent portion 112C. The latching plate 112 is biased in a counterclockwise direction in FIG. 8 by a coil spring 126 (see FIG. 3) disposed about the first pivot shaft 108. Due to work of the coil spring 126, the bent portion 112C of the latching plate 112 is forced to abut against the operation lever 110 to bias the same in the counterclockwise direction in FIG. 8.

The operation lever 110 serves also as a second latch member by which the afore-mentioned second striker 26 can be caught. For this, the operation lever 110 is shaped like the character "J". The operation lever 110 is secured at its base portion to the first pivot shaft 108, as is described hereinabove.

The operation lever 110 is formed near the base portion with a striker catching recess 110B by which the second striker 26 can be caught. The catching recess 110B has a lower shoulder portion 110A against which the second striker 26 is collidable. The operation lever 110 further has, at a position remote from the base portion, a bent portion 110C.

As is seen from FIG. 5, a spring 128 extends between the base wall 102c of the base structure (102+104) and the bent portion 110C of the operation lever 110, so that the operation lever 110 is biased in a counterclockwise direction in FIG. 5 to abut against a portion of the base structure (102+104).

As is understood from FIG. 5, the side wall 102b and the base wall 102c of the base structure (102+104) are partially cut away to form an opening or recess 102B which is sized to receive the second striker 26.

The side wall 102b of the base structure (102+104) is integrally formed with a raised stopper piece 102C by which an upward pivoting of the operation lever 110 is restricted to a certain degree.

As is understood from FIG. 5, the latch condition detecting lever 114 is generally arc-shaped, whose terminal end portion is located near the recess 102B. The detecting lever 114 is formed at its middle portion with a recess 114A with which the second striker 26 is engageable. The detecting lever 114 is further formed at its head portion with first and second bent portions 114B and 114C which face each other.

As is seen from FIG. 3, the first bent portion 114B holds one end of a spring 132 whose other end is hooked to a second pivot shaft 130 which will be described hereinafter. With this spring 132, the latch condition detecting lever 114 is biased in a counterclockwise direction in FIG. 5.

The second pivot shaft 130 extends in parallel with the first pivot shaft 108 and is pivotally supported by the side walls 102a and 102b and the intermediate wall 104A of the base structure, as is best understood from FIG. 3.

A stopper member 134 and an arm member 136 are secured to the second pivot shaft 130 to pivot therewith.

As is seen from FIG. 5, the stopper member 134 is formed at diametrically opposed portions of the second pivot shaft 130 with first and second stopper parts 134A and 134B. The first stopper part 134A is engageable with the second bent portion 114B of the latch condition detecting lever 114, while the second stopper part 134B is engageable with an engaging part 102D which is raised from the side wall 102b of the base structure.

Figure 7:
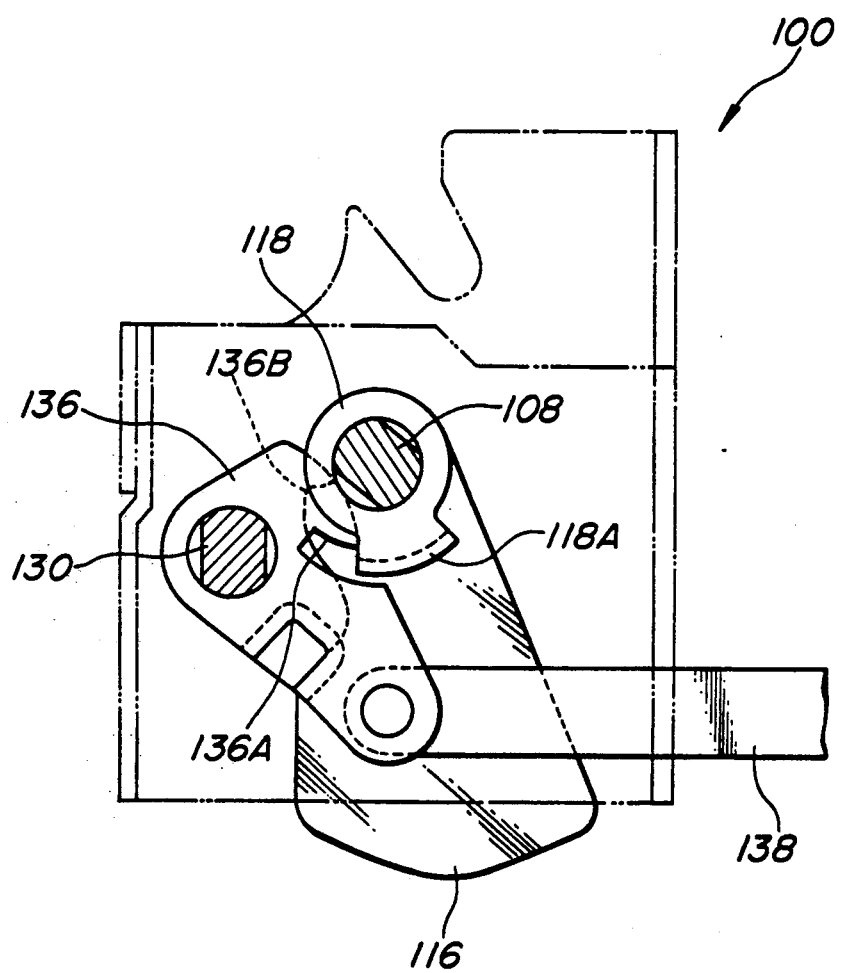
FIG. 7 is a sectional view taken along the line VII—VII of FIG. 3.

As is seen from FIG. 7, the arm member 136 has a leading end to which a connecting link 138 from the seat slide latching mechanism 200 is pivotally connected. The arm member 136 is formed at its middle portion with an arcuate recess 136A. Under a certain condition, a pawl 118A of the pawl member 118 is inserted into the recess 136A to suppress the pivotal movement of the arm member 136.

Figure 4:
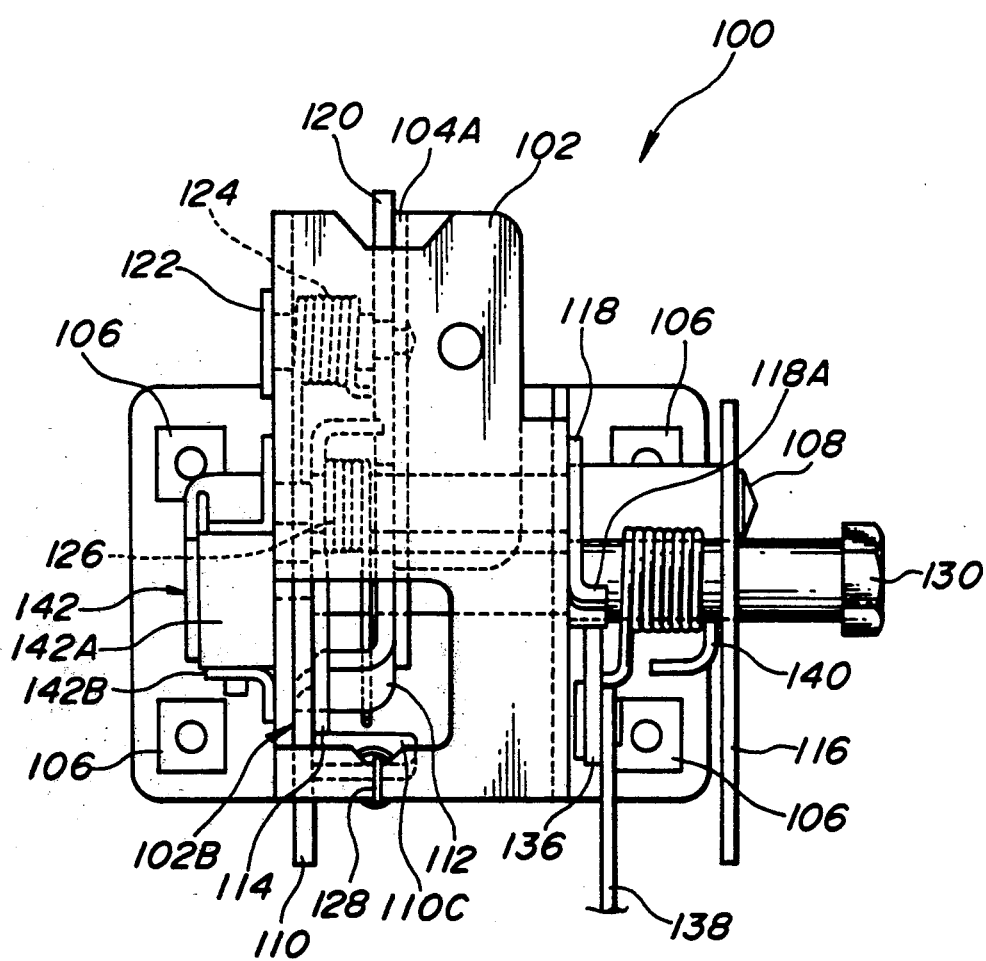
FIG. 4 is a back view of the seat cushion latching device of the invention.
Figure 6:
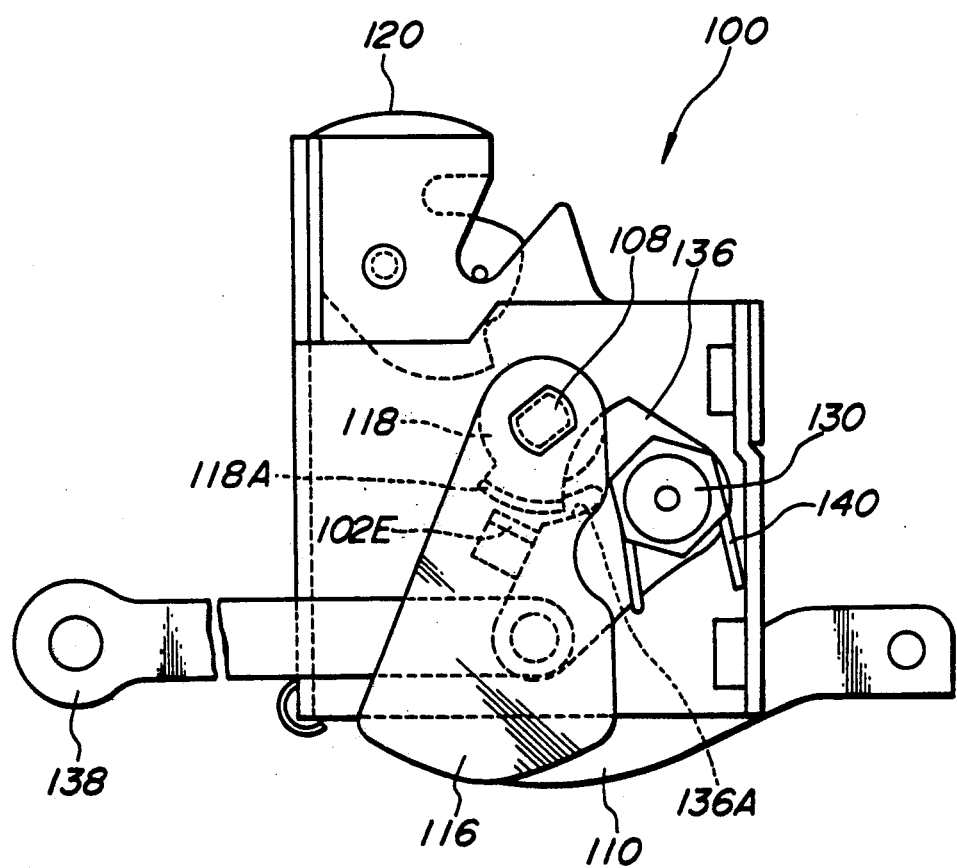
FIG. 6 is a right side view of the seat cushion latching device.

As is best seen from FIG. 4, a coil spring 140 is disposed about the second pivot shaft 130 to bias the arm member 136 (see FIG. 3) and thus the second pivot shaft 130 in a counterclockwise direction in FIG. 5, that is, in a clockwise direction in FIG. 6.

As is seen from FIG. 6, with the biasing force of the spring 140, the arm member 136 is forced to contact with a stopper piece 102E pressed out of the side wall 102a of the base structure.

Designated by numeral 142 in FIGS. 3, 4 and 5 is a damper device which is mounted to the side wall 102b of the base structure near the recess 102B. The damper device 142 comprises an elastic member 142A which is exposed to the recess 102B and a case member 142B which houses the elastic member 142A and is secured to the side wall 102b. As is understood from FIG. 5, the damper device 142 damps a shock produced when the second striker 26 is led into the recess 102B.

As is seen from FIGS. 1 and 2, a second control handle 146 is secured to the second pivot shaft 130 to manually operate the same. The second and first control handles 146 and 144 may be constructed of rigid plastics.

As is understood from FIG. 1, the seat slide latching mechanism 200 comprises a cam plate 201 which is pivotally connected through a pivot shaft 202 to one of the support members 16. The cam plate 201 has one end pivotally connected to the afore-mentioned connecting link 138. Upon rotation of the cam plate 201 in a given direction, the latched engagement between the sliding members 14 and the fixed rails 12 becomes cancelled thereby permitting movement of the seat 10 on and along the fixed rails 12.

In the following, operation of the seat cushion latching device 100 will be described.

For ease of understanding, the description will be commenced with respect to the condition of FIG. 1 wherein the seat cushion 20 assumes its operative latched (or seat occupant holding) position.

Under this normal condition, the seat cushion latching mechanism 100 assumes a first striker latching condition depicted by FIG. 8. That is, the first striker 24 is received in the aligned recesses 102A and 104B of the base structure and latchingly caught by the catching recess 120B of the first latch member 120. Due to biasing force of the coil spring 124, the stepped portion 120C of the first latch member 120 is forced to abut against the first leg portion 112A of the latching plate 112 thereby keeping the first latch member 120 at the latching position. Furthermore, due to biasing force of the spring 32, the latch condition detecting lever 114 is biased in a counterclockwise direction in FIG. 8 causing the second bent portion 114C thereof to engage with the first stopper part 134A of the stopper member 134. Accordingly, rotation of the second pivot shaft 130 and thus that of the arm member 136 in a clockwise direction in FIG. 8 due to manipulation of the second control handle 146 are suppressed.

Thus, under this seat occupant holding condition of the seat cushion 20, the latched condition of the slide latching mechanism 200 can not be cancelled by the second control handle 146.

When now cancellation of the latched condition of the seat cushion latching mechanism 100 is needed, the first control handle 144 is pulled upward in FIG. 8 to such a degree that the same is brought into contact with the raised stopper piece 102C. During this, the first pivot shaft 108 is also rotated in the same direction because the operation lever 110 is secured to the shaft 108. Furthermore, during this, the latching plate 112 is also rotated in the same direction together with the operation lever 110 because the bent portion 112C of the latching plate 112 is kept forced to abut against the operation lever 110, so that the first leg portion 112A of the latching plate 112 is disengaged from the stepped portion 120C of the first latch member 120. As a result, due to the force of the coil spring 124, the first latch member 120 is returned to its original or neutral position releasing the first striker 24.

Thus, thereafter, the seat cushion 20 is permitted to pivot freely about the pivot shaft 18 (see FIG. 1).

When the free seat cushion 20 is folded or pivoted in a clockwise direction in FIG. 1 by a certain degree, the second striker 26 is led into the recess 102B of the base structure (102+104) and collides with both the lower shoulder portion 110A of the operation lever 110 and the latch condition detecting lever 114 to rotate them in a clockwise direction in FIG. 8. Finally, the movement of the second striker 26 induces a second striker latching condition of FIG. 9 wherein the second striker 26 is caught by both the recess 110B of the operation lever 110 and the recess 114A of the lever 114. It is to be noted that the collision of the second striker 26 against the levers 110 and 114 is damped by the damper device 142.

The seat cushion 20 thus assumes a folded latched condition as shown in FIG. 2.

As is seen from FIG. 9, under this condition, by the second striker 26, the latch condition detecting lever 114 is forced to assume its leftmost position against the force of the spring 132, so that the second bent portion 114C of the lever 114 is disengaged from the first stopper part 134A of the stopper member 134. Accordingly, manipulation of the second control handle 146 for achieving cancellation of the latched condition of the slide latching mechanism 200 is permitted.

This means that by manipulating the second control handle 146, the seat 10 can be moved forward or rearward with the seat cushion 20 kept folded.

When now cancellation of the latched condition of the folded seat cushion 20 is required, the first control handle 144 is pulled upward again to such a degree that the operation lever 110 becomes in contact with the stopper piece 102C of the side wall 102b of the base structure. With this operation, the recess 110B of the operation lever 110 releases the second striker 26, so that thereafter the seat cushion 20 is permitted to pivot freely about the pivot shaft 18.

When the free seat cushion 20 is pressed downward, the first striker 24 is led into the aligned recesses 102A and 104B of the base structure (102+104) and collides with the lower peripheral side 120A of the first latch member 120 to rorate the member 120 in a counterclockwise direction in FIG. 5 against the force of the coil spring 124. The insertion of the first striker 24 into the aligned recesses 102A and 104B induces finally the first striker latching condition of FIG. 8 which has been described hereinafore. Thus, the operative latched condition of the seat cushion 20 as shown in FIG. 1 is achieved.

As will be understood from FIG. 7, when the first control handle 144 is moved upward for the purpose of unlatching the seat cushion 20, the pawl member 118 secured to the first pivot shaft 108 is rotated in a direction to cause the pawl 118A thereof to be caught by the arcuate recess 136A of the arm member 136. Thus, under this condition, rotation of the arm member 136 is suppressed, and thus, cancelling operation of the seat slide latching mechanism 200 is suppressed.

While, when the second control handle 146 is pulled upward for the purpose of cancelling the latched condition of the seat slide latching mechanism 200, the pawl 118A of the pawl member 118 contacts an arcuate peripheral portion 136B of the arm member 136 suppressing rotation of the first pivot shaft 108.

In other words, the operation for unlatching the seat cushion 20 by the first control handle 144 and the operation for cancelling the latched condition of the seat slide latching mechanism 200 by the second control handle 146 are not achieved at the same time.

As will be understood from the foregoing description, in the present invention, the changing of the seat cushion 20 from the operative latched position to the folded latched position or vice verse is achieved by manipulating only one operation lever, that is, only the first control handle 144, unlike in the case of the aforementioned conventional seat cushion latching device.

What is claimed is:

1. An automotive set comprising:
   a seat cushion;
   a fixed member;

pivot means for permitting said seat cushion to pivot between an operative position and a folded position with respect to said fixed number;

first and second strikers secured to space portions of said seat cushion;

a base structure secured to said fixed member;

first latching means installed in said base structure for latching said first striker when said seat cushion assumes said operative position;

second latching means installed in said base structure for latching said second striker when said seat cushion assumes said folded position;

an operation lever pivotally supported by said base structure; and link means linking said operation lever to both said first and second latching means so that a pivotal movement of said operation lever in a given direction cancels a latched condition of one of said first and second latching means.

2. An automotive seat as claimed in claim 1, in which said operation lever constitutes a part of said second latching means.

3. An automotive seat as claimed in claim 2, in which said first latching means comprises:

a first latch member pivotally supported by said base structure, said first latch member being formed with a first striker catching recess by which said first striker is caught when said seat cushion assumes said operative position; and first biasing means for biasing said first latch member in a releasing direction to release said first striker from said first striker catching recess.

4. An automotive seat as claimed in claim 3, in which said second latching means comprises:

means for defining a second striker catching recess in said operation lever, said second striker catching recess catching said second striker when said seat cushion assumes said folded position; and second biasing means for biasing said operation lever in a given direction to assure the catching of said second striker by said second striker catching recess of the operation lever.

5. An automotive seat as claimed in claim 4, in which said link means comprises:

a latching plate pivotally supported by said base structure, said latching plate having first and second leg portions, said first leg portion being engageable with a stepped portion of said first latch member to suppress the rotation of said first latch member in said releasing direction;

third biasing means for biasing said latching plate in such a direction as to force said second leg portion to abut against said operation lever to bias the same in said given direction.

whereby said pivotal movement of said operation lever in said given direction is made against the force of said second and third biasing means and rotates said latching plate in a direction to disengage said first leg portion from said stepped portion of said first latch member.

6. An automotive seat as claimed in claim 5, in which said operation lever and said latching plate are arranged to pivot about a common axis.

7. An automotive set as claimed in claim 6, in which said common axis is an axis of a pivot shaft to which said operation lever is secured, said latching plate being pivotally connected to said pivot shaft.

8. An automotive seat as claimed in claim 7, further comprising comprising a control mechanism for controlling a seat slide latching mechanism which latches said seat to said fixed member when actuated.

9. An automotive seat as claimed in claim 8, in which said control mechanism is so constructed as to permit operation of said seat slide latching mechanism when said second striker is latched by said second latching means.

10. An automotive seat as claimed in claim 9, in which said control mechanism comprises:

a stopper member pivotally connected to said base unit, said stopper member suppressing the operation of said seat slide latching mechanism when in a locked condition;

a latch condition detecting lever pivotally connected to said pivot shaft of said operation lever, said latch condition detecting lever cancelling the locked condition of said stopper member when said second striker is latched by said second latching means.

11. An automotive seat as claimed in claim 10, further comprising:

a pawl member secured to said pivot shaft of said operation lever and having a pawl; and an arm member pivotally connected to said base structure and having a recess into which said pawl is inserted when said pawl member pivots in a given direction.

12. An automotive seat as claimed in claim 7, further comprising a damper device which is secured to said base structure to damp a shock which is produced when said second striker abuts against said operation lever to be led into said second striker catching recess.

13. An automotive seat as claimed in claim 12, in which each of said first, second and third biasing means is a spring.

14. An automotive seat as claimed in claim 1, further comprising a control mechanism for controlling a seat slide latching mechanism which latches said seat to said fixed member when actuated.

15. An automotive seat as claimed in claim 14, in which said control mechanism is so constructed as to permit operation of said seat slide latching mechanism when said second striker is latched by said second latching means.

16. An automotive seat as claimed in claim 15, in which said control mechanism comprises:

a stopper member pivotally connected to said base unit, said stopper member suppressing the operation of said seat slide latching mechanism when in a locked condition;

a latch condition detecting lever pivotally connected to said base structure, said latch condition detecting lever cancelling the locked condition of said stopper member when said second striker is latched by said second latching means.

17. An automotive seat as claimed in claim 16, further comprising:

a pawl member pivotally connected to said base structure, said pawl member pivoting together with said operation lever and having a pawl; and an arm member pivotally connected to said base structure and having a recess into which said pawl is inserted when said pawl member pivots in a given direction.

* * * * *